United States Patent
Peterson et al.

(10) Patent No.: US 9,214,091 B2
(45) Date of Patent: Dec. 15, 2015

(54) DIGITAL CONTENT AND ASSESSMENT DELIVERY

(71) Applicant: Pearson Education, Inc., Upper Saddle River, NJ (US)

(72) Inventors: Jesse E. Peterson, Cedar Rapids, IA (US); Michael S. Svendsen, Coralville, IA (US)

(73) Assignee: Pearson Education, Inc., Upper Saddle River, NJ (US)

( * ) Notice: Subject to any disclaimer, the term of this patent is extended or adjusted under 35 U.S.C. 154(b) by 0 days.

(21) Appl. No.: 14/194,160

(22) Filed: Feb. 28, 2014

(65) Prior Publication Data

US 2015/0248841 A1    Sep. 3, 2015

(51) Int. Cl.
G09B 7/07    (2006.01)

(52) U.S. Cl.
CPC ............................... *G09B 7/07* (2013.01)

(58) Field of Classification Search
CPC .................................. G09B 5/08; G09B 7/07
USPC ........................................................ 434/350
See application file for complete search history.

(56) References Cited

U.S. PATENT DOCUMENTS

| | | | |
|---|---|---|---|
| 7,483,670 B2 | 1/2009 | Walker et al. | |
| 2004/0229199 A1 | 11/2004 | Ashley et al. | |
| 2005/0182306 A1 | 8/2005 | Sloan | |
| 2006/0282896 A1* | 12/2006 | Qi ................................ | 726/25 |
| 2008/0096178 A1 | 4/2008 | Rogers et al. | |
| 2009/0271517 A1 | 10/2009 | Naylor et al. | |
| 2010/0088740 A1 | 4/2010 | Waters | |
| 2011/0167103 A1 | 7/2011 | Acosta et al. | |
| 2011/0244439 A1 | 10/2011 | Reed et al. | |
| 2012/0034590 A1 | 2/2012 | Hallsten | |
| 2013/0012136 A1 | 1/2013 | Broderick et al. | |
| 2013/0078605 A1 | 3/2013 | Toussaint, Jr. et al. | |
| 2013/0080870 A1 | 3/2013 | Jacobs | |
| 2013/0173776 A1 | 7/2013 | Kang et al. | |
| 2013/0209982 A1* | 8/2013 | Rooks et al. .................. | 434/350 |
| 2014/0186814 A1* | 7/2014 | Rooks et al. .................. | 434/350 |
| 2014/0242566 A1 | 8/2014 | Rich, Jr. et al. | |

FOREIGN PATENT DOCUMENTS

WO    2014/026511 A1    2/2014

OTHER PUBLICATIONS

IP Address Blocking, Web Archive, Web. Jan. 25, 2013. <https://web.archive.org/web/20130125194757/http://en.wikipedia.org/wiki/IP_address_blocking>, hereinafter IPBlock.*
Screened Subnet Firewall, Web Archive, Web. Jan. 1, 2013. <https://web.archive.org/web/20130113065341/http://www.vtcif.telstra.com.au/pub/docs/security/800-10/node58.html).*

(Continued)

*Primary Examiner* — Sam Yao
*Assistant Examiner* — Thomas Hong
(74) *Attorney, Agent, or Firm* — Kilpatrick Townsend & Stockton LLP

(57) ABSTRACT

Generally, embodiments of the disclosure are directed to methods, computer readable medium, servers, and systems for distributing an educational test question between a back-end computer and a plurality of user devices using a local server. The local server can provide a first network to a plurality of user devices and block access to a second network when a test is in progress.

24 Claims, 9 Drawing Sheets

(56) References Cited

OTHER PUBLICATIONS

Pearson Education, Inc., *TestNav 7 Combined Technical Guide*. Feb. 16, 2012.
U.S. Appl. No. 14/222,350, filed Mar. 21, 2014 by Brendan Jared Kealey, 48 pages.
U.S. Appl. No. 14/222,317, filed Mar. 21, 2014 by Brendan Jared Kealey, 49 pages.
ExamSoft: How it works, Web Archive, Web. Mar. 17, 2013. <https://web.archive.org/web/20130317090511/http://learn.examsoft.com/how-it-works-4>.
Javascript—Browser Detect and CSS Switch, Web Archive, Web. Jul. 14, 2012. <https://web.archive.org/web/20120714071945/http://www.dreamincode.net/forums/topic/30206-javascript-browser-detect-and-css-switch/>.
Automatic Reconnect, Web Archive, Web. Dec. 22, 2011. <https://web.archive.org/web/20111222094650/http://wiki.tcl.tk/12379>.
Final Office Action mailed on Sep. 15, 2014 for U.S. Appl. No. 14/222,317, 18 pages.
Final Office Action mailed on Sep. 11, 2014 for U.S. Appl. No. 14/222,350, 13 pages.
BitZipper FAQ, Web Archive, Mar. 10, 2013. <https://web.archive.org/web/20130310110014/http://www.bitzipper.com/faq_run.html>.
Extended European Search Report completed Jun. 16, 2015 for European Patent Application No. EP15154570 filed Feb. 10, 2015, all pages.
Notice of Abandonment mailed Mar. 19, 2015 for U.S. Appl. No. 14/222,350, filed Mar. 21, 2014, 2 pages.
Notice of Allowance mailed May 1, 2015 for U.S. Appl. No. 14/222,317, filed Mar. 21, 2014, 5 pages.
Non-Final Office Action mailed on Jan. 30, 2015 for U.S. Appl. No. 14/222,317, 17 pages.
Final Office Action mailed on Mar. 19, 2015 for U.S. Appl. No. 14/222,317, 14 pages.
Notice of Allowance mailed on Apr. 16, 2015 for U.S. Appl. No. 14/222,317, 5 pages.

* cited by examiner

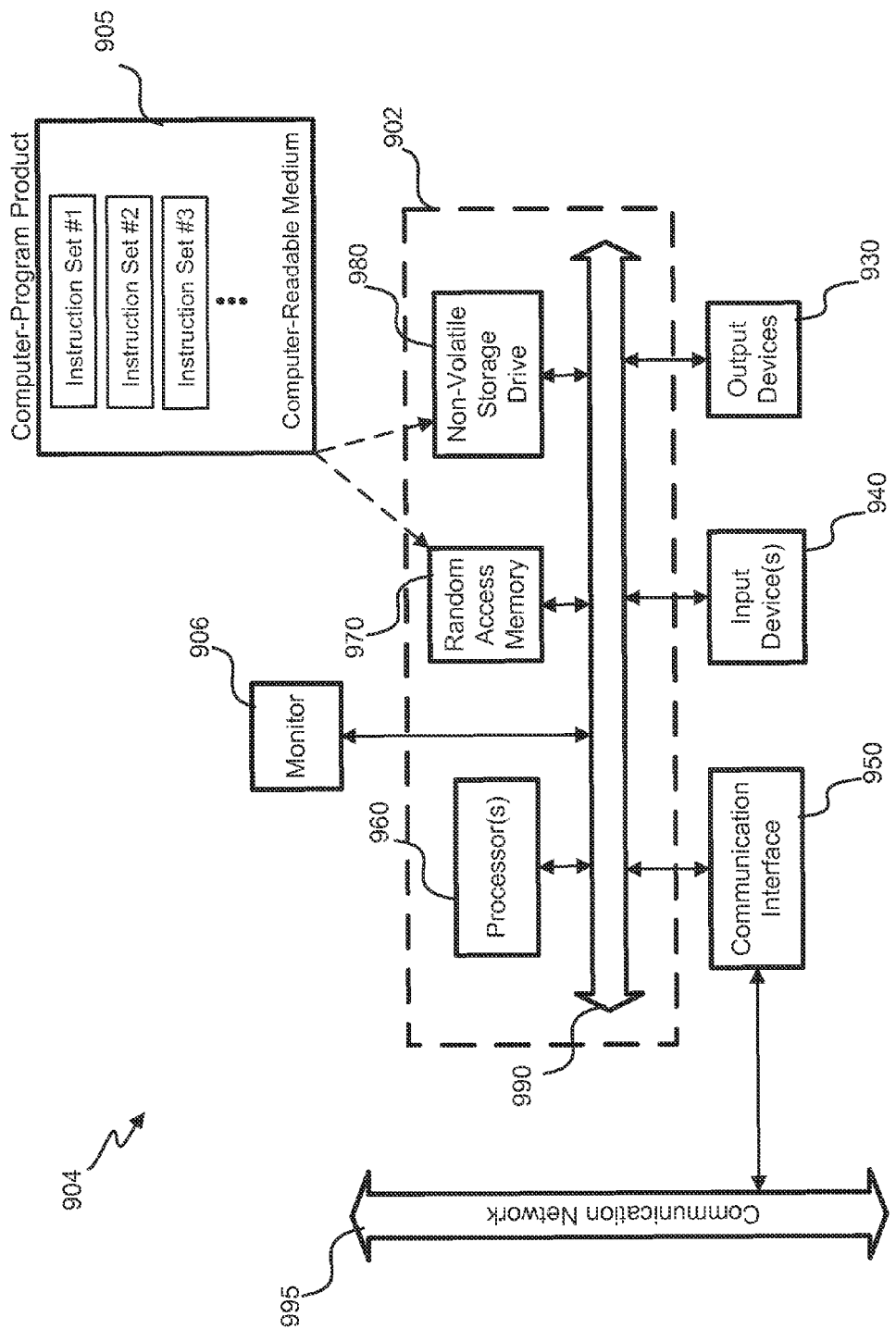

DIGITAL CONTENT AND ASSESSMENT DELIVERY

BACKGROUND

This disclosure relates in general to distributing content between a server and a plurality of users devices, and, but not by way of limitation, to providing a network to the user devices amongst other things.

Education, classrooms, and testing facilities are needed for students in remote locations. However, the facilities in the remote locations cannot always rely on the infrastructure surrounding these facilities, including electricity and/or internet service. Further, some devices that provide internet services to remote locations are not secure enough for a minimum level of security needed for a testing environment.

SUMMARY

In one embodiment, the present disclosure provides a local server for providing a distribution of an educational test question between a backend computer and user devices. The local server provides a network connection between a first network and the user devices. The user devices receive the educational test question from the local server and provide information indicative of test answers back to the local server. The local server is also configured to determine when a test is in progress to block access to a second network (e.g., between the local server and the backend computer).

In another embodiment, the present disclosure provides a system for providing a distribution of an educational test questions. The system includes a local server and a backend computer. The local server provides a network connection between a first network and one or more user devices. The user devices receive the educational test question from the local server and provide information indicative of test answers back to the local server. The local server is also configured to determine when a test is in progress to block access to a second network (e.g., between the local server and the backend computer).

In yet another embodiment, the present disclosure provides a method for distributing an educational test question between a backend computer and user devices. The method includes identifying a storage medium (e.g., with a local server), identifying a network adapter, identifying a network antenna that interacts with the network adapter, and determining when a test is in progress to block access to the second network (e.g., between a local server and the backend computer). The method can provide a network connection between a first network and the user devices. The user devices can receive the educational test question from the local server and provide information indicative of test answers back to the local server.

BRIEF DESCRIPTION OF THE DRAWINGS

FIG. 9 illustrates an example special-purpose computer system, according to at least one example.

Figure 1:
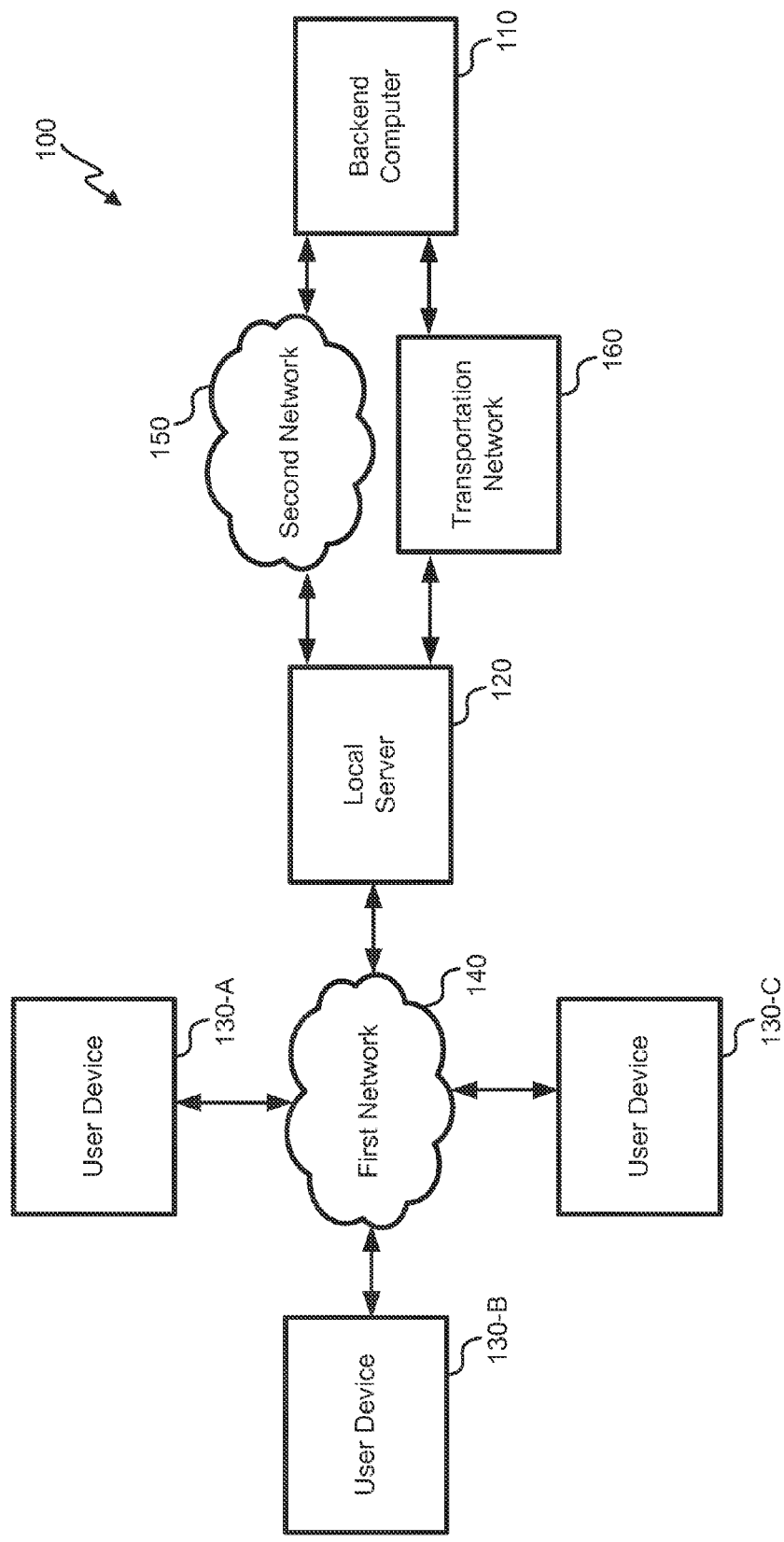
FIG. 1 illustrates an example architecture for distributing educational test questions and receiving test answers described herein that includes a local server, backend computer, a first and second network, and a plurality of user devices, according to at least one example.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one embodiment, the present disclosure provides a local server for providing a distribution of an educational test question between a backend computer and a plurality of user devices. This local server includes, for example, a processor, a local memory coupled with the processor, and a storage medium. The storage medium contains the educational test question. The educational test question is stored on the storage medium (e.g., by the backend computer) and the storage medium is interruptably coupled with the local server. When the storage medium is coupled with the local server, the educational test question is copied to the local memory. The local server also includes, for example, a network adapter. The network adapter enables the local server to provide a network connection between a first network and the plurality of user devices, including enabling access to a first user that operates a first user device in the plurality of user devices and a second user that operates a second user device in the plurality of user devices. The first and second users may be engaged with the first network. The network adapter relays the educational test question from the local memory to the first user device and the second user device.

The local server also includes, for example, a network antenna that interacts with the network adapter. The network antenna is used to transmit the educational test question to the first user device and the second user device from the local memory via the first network. In response to receiving the educational test question at the first user device and the second user device, the network antenna receives information indicative of a first test answer from the first user device via the first network and a second test answer from the second user device via the first network. The network antenna provides the first test answer and second test answer to the backend computer on a second network. The local server is also configured to determine when a test is in progress to block access to the second network.

In some embodiments, the educational test question is provided to the first user device and the second user device at a start time and the first test answer and second test answer are received at an end time. The local server can block access to the second network at the start time and unblock access to the second network at the end time. In some embodiments, the local server is not connected to the first network and the second network at the same time. The educational test question may be the same for the first user device and the second user device. The first test answer from the first user device and the second test answer from the second user device may be different from each other.

In some embodiments, the educational test question is encrypted when the educational test question is stored with the storage medium and decrypted when the educational test question is stored with the local memory. The decrypted educational test question can be transmitted to the first user device and the second user device via the first network. The educational test question may be automatically copied to the local memory without instruction from a user.

In another embodiment, the present disclosure provides a system for providing a distribution of an educational test question between a backend computer and a plurality of user devices. The system comprises a backend computer and a local server. The local server comprises a processor, local memory coupled with the processor, and a storage medium. The storage medium contains the educational test question. The educational test question is stored on the storage medium by the backend computer and the storage medium is interruptably coupled with the local server. When the storage medium is coupled with the local server, the educational test question is copied to the local memory. The local server also includes, for example, a network adapter. The network adapter enables the local server to provide a network connection between a first network and the plurality of user devices, including enabling access to a first user that operates a first user device in the plurality of user devices and a second user that operates a second user device in the plurality of user devices. The first and second users may be engaged with the first network. The network adapter relays the educational test question from the local memory to the first user device and the second user device.

The local server also includes, for example, a network antenna that interacts with the network adapter. The network antenna is used to transmit the educational test question to the first user device and the second user device from the local memory via the first network. In response to receiving the educational test question at the first user device and the second user device, the network antenna receives information indicative of a first test answer from the first user device via the first network and a second test answer from the second user device via the first network. The network antenna provides the first test answer and second test answer to the backend computer on a second network. The local server is also configured to determine when a test is in progress to block access to the second network.

In yet another embodiment, the present disclosure provides a method for distributing an educational test question between a backend computer and a plurality of user devices. The method identifies a storage medium. The storage medium contains the educational test question and the educational test question is stored on the storage medium by the backend computer. The storage medium is interruptably coupled with the local server and when the storage medium is coupled with the local server, the educational test question is copied to the local memory.

The method also identifies a network adapter. The network adapter enables the local server to provide a network connection between a first network and the plurality of user devices, including enabling access to a first user that operates a first user device in the plurality of user devices and a second user that operates a second user device in the plurality of user devices. The first and second users engaged with the first network, and the network adapter relays the educational test question from the local memory to the first user device and the second user device.

The method also identifies a network antenna that interacts with the network adapter. The network antenna is used to transmit the educational test question to the first user device and the second user device from the local memory via the first network. In response to receiving the educational test question at the first user device and the second user device, the network antenna receives information indicative of a first test answer from the first user device via the first network and a second test answer from the second user device via the first network. The network antenna provides the first test answer and second test answer to the backend computer on a second network.

The method also determines, by the local computer, when a test is in progress to block access to the second network. In some embodiments, the educational test question is provided to the first user device and the second user device at a start time and the first test answer and second test answer are received at an end time. The local server can block access to the second network at the start time and unblocks access to the second network at the end time. The educational test question can be encrypted when the educational test question is stored with the storage medium and decrypted when the educational test question is stored with the local memory.

In an illustrative example, a local server is provided to a classroom of students by placing the local server in the classroom and turning it on. The local server receives a storage medium (e.g., flash drive) with one or more educational test questions stored on it. The educational test question are copied to a local memory. The local server provides a network for one or more user devices and, once the user devices are connected with the network, the local server provides the educational test question to the user devices. The distribution of the educational test question can signify a start of a test and the local server can be configured to block access to a second network for the duration of the test. The local server can receive individual test answers from the user devices and identify the end of the test. The test answers can be sent to a backend computer via the second network. In some examples, the test questions or answers may be encrypted/decrypted, the user may be authenticated, or a session identifier may be established during the test.

With reference now to FIG. 1, a block diagram of one embodiment of a system for distributing educational test questions and receiving test answers is shown. The system 100 includes example architecture, including a backend computer 110, local server 120, plurality of user devices 130, first network 140, second network 150, and transportation network 160.

The system 100 includes a backend computer 110. The backend computer 110 is configured to provide an educational test question to a storage medium. For example, the backend computer 110 encrypts the educational test question and transmits it (e.g., through a network interface, via a network 150 or transportation network 160, through a wired communication line, etc.) to a storage medium. The storage medium can be accessible by a local server.

The storage medium may be volatile (such as random access memory (RAM)) and/or non-volatile (such as read-only memory (ROM), flash memory, universal serial bus (USB), etc.). The storage medium may also include removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the storage medium may include multiple different types of memory, such as static random access memory (SRAM), dynamic random access memory (DRAM), or ROM.

The backend computer 110 is also configured to receive test answers from a local server 120 via a second network 150 or transportation network 160. For example, when the test question is open-ended (e.g., an essay question), the test answers can include multi-word responses. When the test question is a multiple choice exam, the test answers can include "A," "B," "C," etc. answers that correspond with each educational test question. In some examples, the educational test question is a single question and the test answer is a single answer to the question. The users can provide individual answers to the educational test question.

In some embodiments, the test answers can correspond with an identifier. For example, the identifier identifies a user or user device associated with the test answer. The backend computer 110 can receive a first identifier associated with a first user and a first test answer and a second identifier associated with a second user and a second test answer.

In some embodiments, a score is calculated. The backend computer 110 compares the received test answers with an answer key to determine a test score for each user that provided test answers. The score can be associated with the identifier, user, user device, local server, or any other entity in order to provide feedback about the test and a user's performance shown through the comparison and/or score.

In some embodiments, the backend computer 110 is also configured to implement the functions and features using a network interface, one or more engines (e.g., a scoring engine that determines a score for a user, an encryption engine that encrypts the test questions to put on the storage medium, a decryption engine that decrypts the test answers received from the local server, etc.), and one or more data stores (e.g., to store test questions, test answers, user identifiers, etc.).

The system 100 also includes a local server 120. The local server 120 is configured to copy and/or decrypt the educational test question received from a storage medium to a local memory. The educational test question may also remain on the storage medium and/or interruptably couple with the local server 120. The local server is also configured to provide a network connection to a first network to a plurality of user devices, allow users to engage with the first network, and block access to a second network. The local server 120 is also configured to relay an educational test question to the user devices and receive information indicative of test answers from the user devices. Details and features of one type of local server 120 are provided in association with FIG. 2.

The system 100 also includes a plurality of user devices 130, including 130-A, 130-B, and 130-C. The plurality of user devices 130 are configured to receive an educational test question through a first network 140 provided by a local server 120. For example, the local server 120 transmits the educational test question via a network interface and the user devices 130 accept the educational test question through a network antenna/network adapter/network interface configuration. The user devices 130 can provide the educational test question to a user (e.g., by displaying the question on a screen associated with the user devices 130, by audibly providing the question through speakers on the user devices 130, etc.).

The user devices 130 are also configured to accept a test answer from a user. The test answer can be typed, spoken, or otherwise identified by the user to be accepted by the user device. For example, after the user device provides the educational test question to the user (e.g., displayed, audibly provided, etc.), the user provides a test answer that corresponds with the educational test question back to the user device.

The test answer can be stored on the user device (e.g., local memory, storage medium, etc.). The user devices 130 can also submit the test answer to the local server 120. The test answer may be transmitted directly to the local server 120 without storing the test answer on the user device. For example, the user may provide the test answer directly to the local server 120 (e.g., through a network-based form or network page) and/or the test answer may be stored temporarily and deleted from the user device after the test answer is provided to the local server 120.

In some embodiments, the user devices 130 are configured to access a second network 150 when the local server 120 has not blocked access to the second network. For example, the second network 150 can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof.

The user devices 130 are also configured to interact with the local server 120 during a test (e.g., between the start time and end time of the test). For example, the user devices 130 access a first network 140 that is provided by a local server 120. The local server 120 can broadcast a network signal for the first network that is recognized by the user devices 130. Modules or engines (e.g., software and/or hardware) can connect the user devices 130 to the network and allow the users operating the user devices to engage with the first network 140.

Once connected, the user devices 130 can receive transmitted data from the local server 120. For example, the local server 120 transmits (e.g., via a network adapter and network antenna) the educational test question from a local memory to the user devices 130. In response to receiving the educational test question at the user devices 130, the network antenna receives information indicative of one or more test answers from the user devices 130 via the first network.

The user devices 130 can interact with the local server 120 with an identifier. For example, the user device receives a unique identifier (e.g., user name, session identifier, etc.) before the local server 120 provides the educational test question. The user device provides the identifier to the local server 120 to identify, authenticate, or provide credentials to the local server 120. The local server 120 verifies the identifier and provides the educational test question to the user device. The received test answer from the user device may also correspond with the identifier so that when the local server 120 provides the test answer to the backend computer 110, the identifier can accompany the test answer to identify the user and/or user device.

In some embodiments, the user devices 130 are also configured to implement the functions and features using a network interface, one or more engines (e.g., a test question engine that provides the test question for a user, a test answer engine that receives the test answer from the user, an identifier engine that identifies the user device and/or user by an identifier for a local server 120 or backend computer 110, etc.), and one or more data stores (e.g., to store test questions, test answers, identifiers, etc.).

The system 100 also includes one or more networks 140, 150. The one or more networks include wired or wireless connections to one or more intranets, one or more internets, public or private channels, communication tunnels between one or more servers, or other means of communication. For example, the first network 140 is an intranet between the local server 120 and the user devices 130, while the second network 150 is an internet between the local server 120 and the backend computer 110. The networks 140, 150 may include encryption or other forms of protection (e.g., SSL-encryption) to help secure the educational test questions, test answers, identifiers, time counters (e.g., for the beginning/end of the test), credentials, and other information that is transmitted and received between the backend computer 110, local server 120, or user devices 130. One or more devices may communicate, transmit, or receive information through the networks 140, 150, including the backend computer 110, local server 120, or user devices 130.

In some embodiments, the first network 140 is provided by the local server 120. For example, the local server 120 is configured to enable access to the first network 140 by a first user operating a first user device and a second user operating a second user device. The local server 120 can confirm the identifier (e.g., credentials) or authenticate the users or user devices to allow access to the first network 140 (e.g., so that the users can be engaged with the first network 140).

In some embodiments, access to the second network 150 is blocked. For example, the local server 120 is configured to determine when a test is in progress and block access to the second network 150. The local server 120 can utilize a firewall (e.g., to block the Internet or particular internet protocol (IP) addresses), web monitoring device, or other mechanism to block wireless access to the second network 150. In some examples, the access is blocked through wired connections (e.g., unplugging a network cable, etc.).

The system 100 also includes a transportation network 160. The transportation network 160 is configured to deliver a storage medium to a local server 120 (e.g., from a backend computer 110) through one or more transportation vehicles and/or services designed for moving an object from one location to another. The storage medium can include the educational test question.

The transportation network 160 is also configured to transport a local server 120 to a remote location. For example, the local server 120 may begin at a location similar to the location of a backend computer 110. The local server can be transported via the transportation network 160 to a remote location (e.g., a classroom) in order to provide the first network 140 to the remote location. In some examples, the transportation network 160 can include a delivery by a user that remains at the remote location for a determined amount of time (e.g., providing the local server 120 in a briefcase-size container, administering a test in correlation with the use of the local server in the classroom, etc.).

Figure 2:
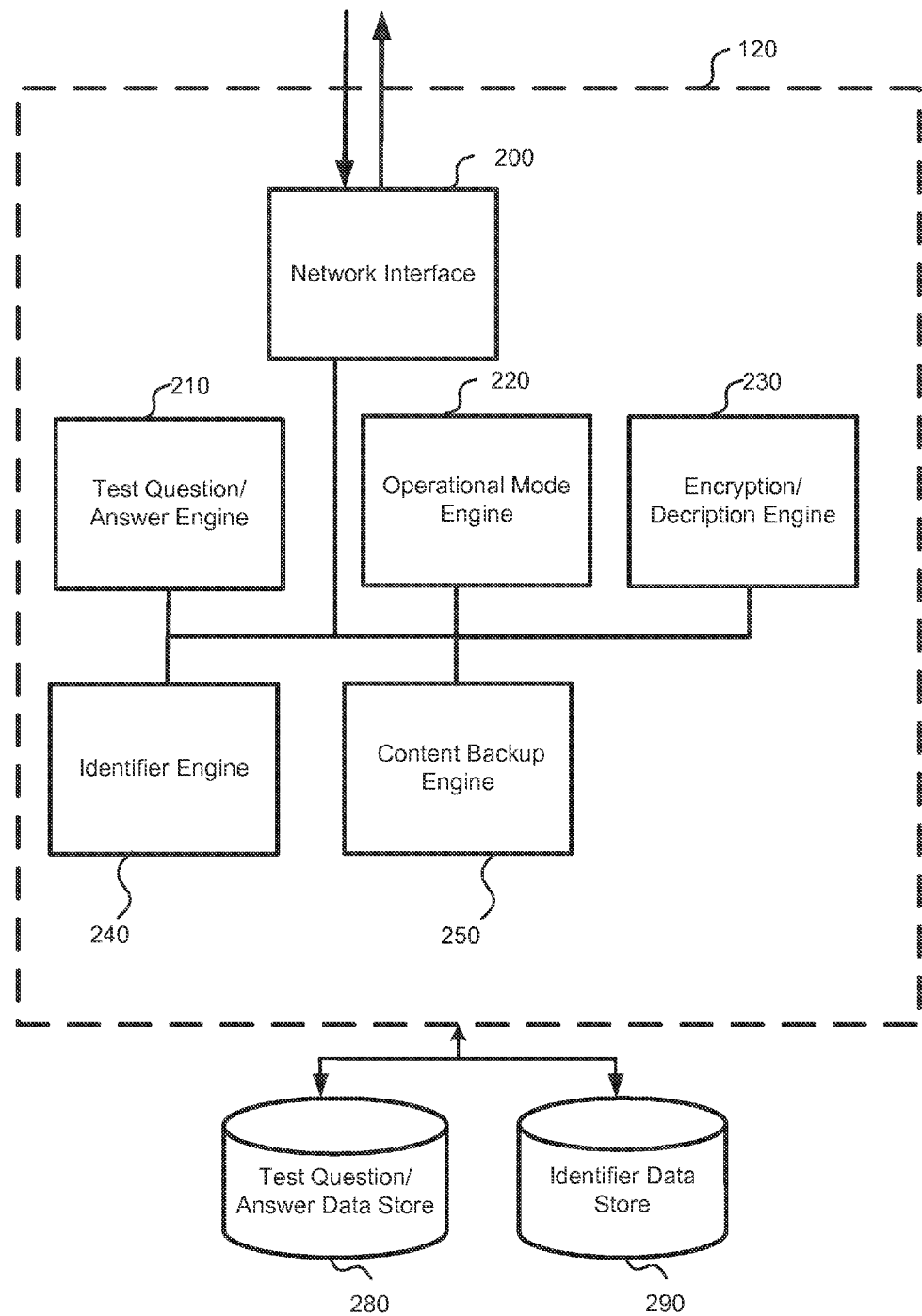
FIG. 2 illustrates an example architecture of a local server with one or more data stores, according to at least one example.

With reference now to FIG. 2, a block diagram of one embodiment of a local server for distributing educational test questions and receiving test answers is shown. For example, the local server 120 includes a network interface 200, test question/answer engine 210, operational mode engine 220, encryption/decryption engine 230, identifier engine 240, content backup engine 250, and one or more data stores, including a test question/answer data store 280 and identifier data store 290. It should be appreciated that one or more of these aspects can also or alternatively be implemented in a backend computer 110 and/or user devices 130.

As depicted in FIG. 2, the local server 120 includes a network interface 200. The network interface 200 allows the devices, networks, and other systems to access the other components of the system 100. The network interface 200 includes features configured to send and receive information, including, for example, a network antenna, a modem, a transmitter, receiver, network adapter or any other feature that can send and receive information. The network interface 200 can communicate via telephone, cable, fiber-optic, and other wired communication network, including the first network 140 and the second network 150. In some embodiments, the network interface 200 communicates via cellular networks, WLAN (wireless local area networking) networks, or any other wireless network.

The network interface 200 can also be configured to send and receive data. In some embodiments, the network interface 200 sends an educational test question to a user device, sends an identifier to a user device, and receives a test answer that corresponds to the educational test question. For example, the user device 130 provides test answers that correspond to the test question, which is received via the network interface 200. In another example, the storage medium provides a test question to the local server 120, which is received via the network interface 200.

The network interface 200 is also configured to enable to local server 120 to communicate through the first network 140 and the second network 150. For example, the local server 120 communicates with the user devices 130 through the first network 140 and communicates with the backend computer 110 through the second network 150.

The local server 120 also includes a test question/answer engine 210. The test question/answer engine 210 is configured to relay an educational test question to one or more user devices. For example, the test question/answer engine 210 can relay the educational test question from a local memory (e.g., the test question/answer data store 280, a secure digital (SD) card, local memory 320, etc.) to a first user device and a second user device. The educational test question may be the same question for each user device. In some examples, the test questions are different for one or more of the user devices (e.g., test question A to user device 1, test question B to user device 2, test question 1 to user device 3, etc.).

The educational test question can take many forms. For example, in an essay test, the educational test question may be a prompt that elicits an extended response (e.g., "explain the differences between outer space and the Earth's core") or a short answer (e.g., "what is the name of the first U.S. President?"). In another example, the test question may be a multiple choice question (e.g., "choose A, B, or C"), a true/false question, or any type of educational test question known in the art.

The test question/answer engine 210 is also configured to relay an educational test question to one or more user devices. The educational test question can be provided on a shared network page via a first network. For example, the educational test question is provided from the local memory to a network page and the user devices access the network page through the first network. The educational test question may be encoded in a frame or through any standard method of displaying information in a network page (e.g., encoded with hypertext markup language (HTML)).

The test question/answer engine 210 is also configured to receive information indicative of one or more test answers. For example, the information includes the test answers (e.g., "my essay includes . . . " or "A, C, B, D") and/or a file that contains the test answers (e.g., "answers.txt"). The test answer can be transmitted from the user device via the first network to the local server (e.g., network interface 200, test question/answer engine 210, etc.). In some examples, the test answers are entered on a network page and transmitted via the first network as the user provides each answer to the user device, resulting in a plurality of transmissions of test answers. The test answers from each device may be different from each other, even though the test questions are the same.

The test question/answer engine 210 is also configured to quickly store test answers, in case a power source to the local server is interrupted. For example, once the test answer is received from the user device, the test answer may be stored in substantially real-time in a storage medium. The test question/answer engine 210 may be configured to clean or condition the test answers to other formats after the test answer is stored in order to preserve the data. In some examples, the initially-stored test answers can be stored in a first location at the local server 120 (e.g., immediately), the local server 120 is rebooted, and the test answers can be stored in a second location at the local server 120.

The test question/answer engine 210 is also configured to provide the test answers to a backend computer 110. For example, the test answers are stored on a storage medium and provided to the backend computer via a transportation network 160. In another example, the test answers are transmitted wirelessly to the backend computer via the second network 150. The test answers may correspond with the educational test questions and/or answer key managed by the backend computer.

The test question/answer engine 210 is also configured to distribute the educational test question to the first user device and the second user device at a start time. The start time can correspond with the start time of a test. The end of the test may correspond with an end time, such that the first test answer and second test answer are received at the end time. The test question/answer engine 210 can provide and receive the test question/answer or time information and store the information in a corresponding storage medium, data store, local memory, and the like.

The test question/answer engine 210 is also configured to interact with the test question/answer data store 280. For example, when the test question/answer engine 210 receives a test question from the storage medium, the test question can be stored in the test question/answer data store 280. The test question/answer engine 210 can relay the stored educational test question from the test question/answer data store 280 (and/or local memory). In another example, when the test question/answer engine 210 receives a test answer from a user device, the test answer can be stored in the test question/answer data store 280.

In some embodiments, the educational test question is automatically copied to the local memory, test question/answer data store 280, storage medium, or other memory location without instruction from a user. For example, when the test question/answer engine 210 identifies that a storage medium has been introduced to an I/O port (e.g., input/output port 324), the test question/answer engine 210 is configured to automatically access the content stored on the storage medium and copy the content to a corresponding location. The test question/answer engine 210 can be configured to look for a particular file type or content item (e.g., an educational test question, a text file, a proprietary file type, etc.).

The local server 120 also includes an operational mode engine 220. For example, the local server 120 operates in a networked mode or a disconnected mode. Various functions and features can be provided in each of these modes and the local server 120 can operate in one or both of these modes at any time.

The operational mode engine 220 is configured to operate the local server in a networked mode (e.g., as a default). The networked mode can help deliver educational and networked content to the user devices. For example, the educational test question is provided to the user devices while the local server is in a networked mode by transmitting the educational test question to each identified user device or by hosting a shared network page that provides the test question at one location for the user devices to access. The operational mode engine 220 can provide the educational test question for a particular time (e.g., after a start time of a test and until an end time of the test) or for an undetermined amount of time (e.g., until the local server is unplugged, loses power, or turned off).

The networked mode may also host a website, data store, or provide enterprise operations (e.g., provide a firewall, distribute service patches, etc.). In some examples, the operational mode engine 220 ensures that the local server provides the functionality of a web server in networked mode.

The operational mode engine 220 is also configured to operate the local server in a disconnected mode. The disconnected mode can help stop access to a network that was provided by the local server. For example, when a network adapter enables the local server to provide a network connection between a first network and a plurality of user devices, the operational mode engine 220 can temporarily disable the network adapter. In another example, when a network adapter is used to relay information to the user devices through a network antenna, the network antenna or any one of the other devices may be deactivated (e.g., turned off, unplugged, toggled, etc.).

The operational mode engine 220 is also configured to block access to the second network. For example, the access to the second network can be blocked at the start time of a test and unblocked at an end time of the test. The blocking may take several forms. For example, the local server can provide an internet protocol (IP) address of 12.x.x.x with a restrictive subnet mask through a cellular adapter and for the second network 150 an IP address of 192.x.x.x with a restrictive subnet mask through a WiFi network adapter for the first network 140. The first and second networks with the restrictive subnet masks can prevent communication between the 12.x.x.x and 192.x.x.x subnets. The operational mode engine 220 can further avoid connectivity between subnets by managing the IP route tables between the first and second network on the local server (e.g., firewall, operating system's inherent routing capabilities, etc.), thus blocking the user devices that are connected to the first network from reaching the second network.

The access may be blocked by disconnecting from the network as well, including ensuring that the local server is not connected to the first network and the second network at the same time. The physical connection may be disabled, wires unplugged, or any other means for disabling a connection. In some embodiments, the local server may run as an autonomous server.

The local server 120 also includes an encryption/decryption engine 230. The encryption/decryption engine 230 is configured to encrypt and/or decrypt information. The information may be optionally encrypted or decrypted. For example, the educational test question is encrypted when the educational test question is stored with the storage medium and decrypted when the educational test question is stored with the local memory. In another example, the decrypted educational test question is transmitted to the first user device and the second user device via the first network.

The encryption/decryption engine 230 is also configured to identify whether received data is encrypted, and decrypt the received data before the data is stored in a data store or local memory. For example, an encrypted educational test question is received from a storage medium. The encryption/decryption engine 230 can identify that the educational test question is encrypted, decrypt the educational test question, and store the educational test question in local memory (e.g., the test question/answer data store 280). The educational test question can be presented to the user devices 130 in a decrypted format.

The encryption/decryption engine 230 is also configured to identify whether to encrypt the data. For example, the test answers are received at the local server in a decrypted format by the user devices (e.g., the test answers are not encrypted when transmitted from a user device or provided into a network page). The encryption/decryption engine 230 can identify that the test answer is decrypted, encrypt the test answer, and store the test answer in a storage medium or transmit the encrypted test answer across a second network to the backend computer 110. The test answers can be presented to the backend computer in an encrypted format.

The encryption/decryption engine 230 is also configured to identify a chain of custody of the data. For example, more than one device or server may encrypt/alter the data and the encryption/decryption engine 230 can identify which devices or servers have done so. This may include a user device adding a device identifier to the test answer, then transmitting the test answer to a proctor device which adds a proctor identifier, and then transmitting the test answer to the local server which also adds a local server identifier. The local server identifier can identify where or when the test was administered and encrypt the test answer so that the backend computer can identify the information added by the local server (e.g., applying a series of keys to decrypt the test answers in a similar method that they were encrypted).

The local server 120 also includes an identifier engine 240. The identifier engine 240 can be configured to identify a user and/or a user device by using a user identifier and/or user device identifier. For example, the identifier engine 240 identifies the user associated with the user device as John Smith in a Colorado high school in Grade 12. The identifier engine 240 may also identify the type of user device operated by the user (e.g., mobile device, tablet, desktop computer) and/or alter educational test question based in part on the identification of the user and/or user device. For example, when the user is identified as an English-speaker, the educational test question is provided in English. In another example, when the user is identified as operating a mobile device, the educational test question is provided for a smaller screen than when the user device is identified as a desktop computer.

The identifier engine 240 is also configured to identify a session identifier. For example, the session identifier is sent to the user device when the user device first accesses the local server and/or a network page provided by the local server. The session identifier can be stored locally at the user device in order to keep track of the current state of the test question, test answer, or any other information that may need to be tracked over a stateless protocol (e.g., HTTP). The session identifier can identify the user that has accessed the test question and may correspond with a user device identifier (e.g., IP address, MAC address) to provide additional protection from fraudsters. When the test answer is transmitted to the local server, the session identifier may be deleted or removed from the user device.

In some embodiments, a secure sockets layer (SSL) or transport layer security (TLS) cryptographic protocol can be used. For example, the local server and user device may exchange an identifier and/or encrypt communications over the first network 140.

The identifier engine 240 is also configured to identify a local server identifier. For example, the local server can include a unique certificate so that when data is received at the backend computer, the backend computer can identify the origin of the data as a particular local server. In some embodiments, the local server identifier is added to the storage medium when the storage medium is coupled with the local server and/or when the local memory is introduced to the local server (e.g., automatically written).

The identifier engine 240 is also configured to identify a storage medium identifier. For example, when the storage medium is coupled with the local server, the storage medium identifier can be copied to the local memory and/or the identifier data store 290. The storage medium identifier can identify the origin of the educational test question (e.g., the testing entity) and incorporate with other identifiers (e.g., a particular teach with identifier Z100 provided the test from storage medium M400 on January $1^{st}$).

The local server 120 also includes a content backup engine 250. The content backup engine 250 is configured to maintain and update the test question/answer data store 280 and the identifier data store 290. For example, the content backup engine 250 may receive information about a user, user device, educational test question, test location, local server identifier, device identifier, and/or current or past testing information from one of the modules discussed herein. This information may then be stored in the appropriate location in the test question/answer data store 280 and the identifier data store 290 using any suitable storage process.

The content backup engine 250 is also configured to delete or remove data (e.g., educational test questions, test answers) from the test question/answer data store 280 as well. For example, after the end time of the test, the data stored in the test question/answer data store 280 and/or the identifier data store 290 (e.g., local memory) can be deleted. The data may be deleted before the local server is connected with the second network 150.

The content backup engine 250 is also configured to backup the data. In some embodiments, the data may be stored on a storage medium that is interruptably coupled to the local server, and then decoupled from the local server to preserve the data (e.g., unplugged, removed, turned off, etc.). The storage medium may be inaccessible on the second network 150 and/or encrypted before the data is accessible via the second network 150. The content backup engine 250 may interact with the encryption/decryption engine 230 to confirm that the data on the storage medium is encrypted before accessing the second network 150.

The local server 120 also interacts with one or more data stores, including a test question/answer data store 280 and identifier data store 290. The data stores are associated with a distributed or local data system accessible by the local server 120. For example, the engines or modules provided by the local server 120 (e.g., test question/answer engine 210, operational mode engine 220, encryption/decryption engine 230, identifier engine 240, or content backup engine 250) provide requests for information that may be stored in one or more of the databases.

The test question/answer data store 280 receives one or more educational test questions from a plurality of sources. For example, the educational test questions are received from an administrator or test publisher that includes educational test questions in one or more test sections. The educational test questions can be stored on a storage medium (e.g., flash drive) or wirelessly transmitted to the local server 120 and uploaded to the test question/answer data store 280. The information stored in the test question/answer data store 280 can include the educational test questions, sections, origin of the information, upload date, or other information to help create and/or analyze a test.

The identifier data store 290 is configured to store information related to the identifier. For example, the identifier data store 290 stores the identifier (e.g., for future use, as a back-up to providing the identifier to the user device). In some examples, the identifier data store 290 also identifies a user and/or user device associated with an identifier.

The identifier data store 290 is configured to store identifier information related to a chain of custody or history of a particular educational test question or test answer. For example, the identifier data store 290 can identify Smith Middle School, proctor Mr. Johnson, test date on January $1^{st}$, transferred to user Johnny Smith, user identifier A10234, answer returned in 59 minutes from the start time of the test, etc. One or more items of information relevant to the educational test question, test answer, or data security can be stored as an identifier or with the identifier data store 290.

Figure 3:
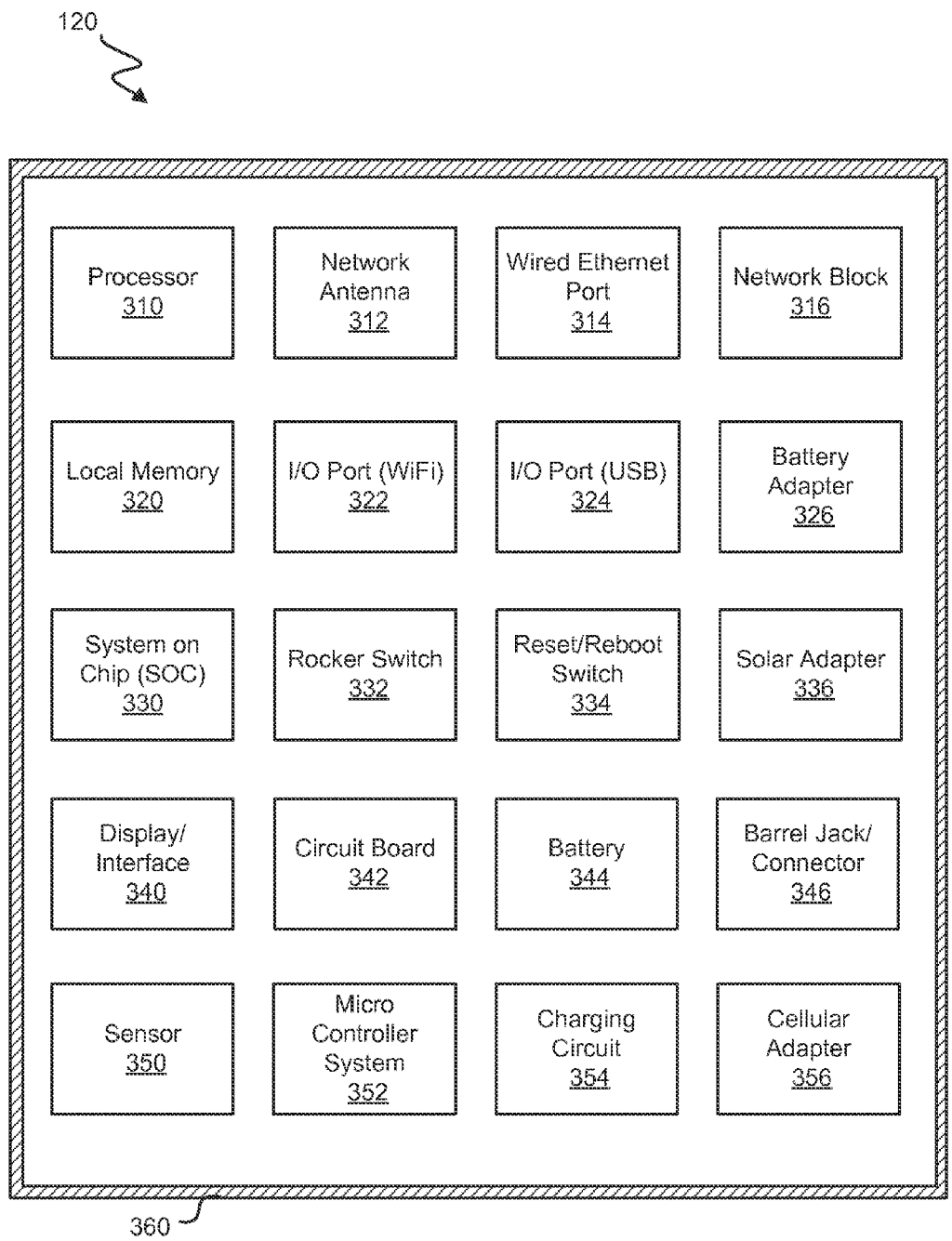
FIG. 3 illustrates an example architecture of a local server with one or more data stores, according to at least one example.

With reference now to FIG. 3, a block diagram of one embodiment of a local server for distributing educational test questions and receiving test answers is shown. For example, the local server 120 includes a processor 310, network antenna 312, wired Ethernet port 314, network block 316, local memory 320, one or more input/output (I/O) ports 322, 324, power adapter 326, system on chip (SOC) 330, rocker switch 332, reset/reboot switch 334, solar adapter 336, display/interface 340, circuit board 342, battery 344, barrel jack/connector 346, interface/sensor 350, micro controller system 352, charging circuit 354, and cellular adapter 356 in a container with padding 360. One or more of these features may be combined, duplicated, added, or omitted without diverting from the essence of the disclosure.

In some embodiments, the local server 120 may be capable of communicating and transferring data or control instructions via both cellular network (or any other suitable wireless network including the Internet or other data network) and short range communications. The local server 120 may also be configured to provide a network to user devices 130 at a remote location with little to no electricity.

The processor 310 may be implemented as appropriate in hardware, computer-executable instructions, firmware, or combinations thereof. Computer-executable instruction or firmware implementations of the processor(s) 310 may include computer-executable or machine-executable instructions written in any suitable programming language to perform the various functions described. In some embodiments, the processor 310 is a piece of hardware that carries out a set of instruction of code for performing operations (e.g., logical).

The network antenna 312 may be implemented as an electronic device to convert electric power into radio waves, so that data can be exchanged wirelessly. The network antenna may support WiFi, any wireless local area network (WLAN), and/or a form of a semiconductor chip (or other data storage element) with an associated wireless transfer (e.g., data transmission) element. The network antenna 312 may be coupled with (e.g., embedded within) the local server 120. Data or control instructions that are transmitted via a particular network (e.g., cellular network) may be applied to the network antenna by means of an interface. Network antenna 312 may be capable of transferring and receiving data using a short range wireless communication capability as well.

The wired Ethernet port 314 may be implemented as an opening on the local server 120 that an Ethernet cable plugs into. The wired Ethernet port 314 can accept a variety of cables (e.g., with RJ-45 connectors). In some embodiments, the wired Ethernet port 314 can include an uplink or wide area network (WAN) port used for connecting to a broadband modem.

The network block 316 may be implemented to block a network (e.g., block the second network 150 while a test is in session). Various method are implemented by the network block 316 including turning off the chip, unplugging wires, deactivating settings, activating a web monitoring program to block groups of network pages (e.g., all network pages), limiting IP settings (e.g., similar to a router), activating a firewall, adjusting native routing capabilities of the operating system on the local server, etc. In some embodiments, a different IP subnet for each adapter can be used, where routing between the two devices can be disabled.

The local memory 320 may be volatile (such as random access memory (RAM)) and/or non-volatile (such as read-only memory (ROM), flash memory, universal serial bus (USB), etc.). The memory 320 may also include removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the storage medium may include multiple different types of memory, such as static random access memory (SRAM), dynamic random access memory (DRAM), or ROM.

In some embodiments, the local server 120 may also include a storage medium in addition to the local memory 320. The storage medium may be a secure digital (SD) non-volatile memory card. When the storage medium is coupled with the local server 120, the content of the storage medium (e.g., the educational test question) can be copied to the local memory 320. The storage medium may also be used to accept data from the local memory 320. For example, a user can operate the display/interface 340 and/or sensor to export data from the local memory to the storage medium (e.g., after the local memory receives one or more test answers from the user devices).

The one or more input/output (I/O) ports 322, 324 can provide an outlet for the local server 120 to connect with additional hardware. For example, I/O port 322 is an outlet that accepts a WiFi or other wireless adapter and the I/O port 324 an outlet that accepts a storage medium that can be interruptably coupled with the local server 120.

When a storage medium is interruptably coupled with the local server 120 (e.g., by providing the storage medium to the I/O port 324 and recognizing the provided storage medium), the educational test question is copied to the local memory of the local server 120. The test question may be stored with the test question data store 280. In some embodiments, the local server 120 is configured to search for other information stored on the storage medium when the storage medium is provided to the I/O port 324.

The power adapter 326 (e.g., AC power adapter, 5-volt wall wart, etc.) can include an electrical device that helps supply power to the local server 120. For example, the power adapter 326 connects to an external power supply (e.g., a wall outlet) to charge the battery 344. The power adapter 326 may also be used to power the local server 120 and charge the batter 344 simultaneously.

The system on chip (SOC) 330 can include an integrated circuit (IC) that integrates many components of a local server 120 into a single chip substrate. For example, the SOC 330 can be any brand of SOC, including a Broadcom® BCM2835 included in a Raspberry Pi® computer. The SOC 330 may contain digital, analog, mixed-signal, and/or radio-frequency functions.

The rocker switch 332 can include an alternating hardware button that can turn the local server 120 (or its components) on or off. For example, the rocker switch 332 is tilted, pushed, pressed, held, clicked, flipped, or otherwise activated to provide power to the local server 120. In another example, the local server 120 powers on when the rocker switch 332 is pressed in and powers off when the rocker switch 332 is pressed again.

The reset/reboot switch 334 can include an alternating hardware tool (e.g., a button, toggle switch, etc.) to reboot the operating system without necessarily turning the local server off (e.g., a soft reboot). In some examples, the power is turned off and on for a running local server, causing an initial boot of the server to commence once the local server restarts (e.g., a hard reboot).

The solar adapter 336 is configured to convert light energy into DC current. The solar adapter can be used to charge the battery 344 by using sunlight, especially when AC current is unavailable (e.g., in remote locations).

The display/interface 340 or computer screen is configured to display output from the local server. For example, the display/interface 340 includes a display (e.g., glass or plastic cover over a digital communication display) that provides 40-characters at a time to a user. The display/interface 340 may also display the IP address of the local server 120 when the local server is connected with the second network 150 or any other network.

The circuit board 342 is configured as a thin but rigid board containing an electronic circuit. A circuit board 342 contains various functions well known in the art.

The battery 344 can be any container consisting of one or more cells in which chemical energy is converted into electricity and used as a source of power. The battery 344 can be used by the local server 120 in instances when a standard alternating-current (AC) electric power supply is unavailable to power the local server 120.

The barrel jack/connector 346 can receive electrical power for the local server 120 through an external electricity source (e.g., wall power, solar panel, etc.). When receiving power, the barrel jack/connector 346 can charge the battery 344 as well.

The sensor 350 can be implemented as a device enabling a user to communicate with the local server 120. For example, the sensor 350 includes an interactive pad that allows the user to select up, down, left, right, and/or enter. The sensor 350 may be used to import or export data when a storage device is connected with the local server 120 (e.g., I/O port 322, 324, wired Ethernet port 314, etc.). The sensor 350 functions to permit the exchange of data and/or control instructions between the circuitry in the local server 120 and the display/interface 340. As noted above, the local server 120 may comprise components to both be the interrogator device (e.g. receiving data) and the interrogated device (e.g. sending data).

The micro controller system 352 is configured to provide a small computer on a single integrated circuit that contains a processor (e.g., processor 310), memory (e.g., RAM, local memory 320), and programmable input/output peripherals. A micro controller system 352 contains various functions well known in the art.

The charging circuit 354 may be implemented as a circuit that helps charge the battery 344 and/or power the local server 120 without using the battery. For example, the charging circuit can include or interact with a micro controller system 352 that accepts the power coming in (e.g., through the wall or solar power), conditions the power, and charges the battery using the conditioned power to make sure the battery charges correctly. The charging circuit 354 can export the charges to the other components (e.g., the SOC 330).

The cellular adapter 356 is configured to connect the local server 120 to a network (e.g., the Internet). Once connected to the Internet, the local server can establish a connection to a network associated with backend computer 110 (e.g., the second network 150). The Internet connection can enable a connection to the backend computer 110.

The container with padding 360 may be implemented as a container (e.g., box or briefcase) with padding (e.g., foam, cushioning, etc.) surrounding the components described herein. The padding may help protect the components while the local server 120 is in transit (e.g., via the transportation network 160). The container may also include a cover over the components (e.g., the SOC 330, battery 344) and one or more holes to access particular components, including one or more ports 312, 322, 324, rocker switch 332, the reset/reboot switch 334, or one or more connectors.

Figure 4:
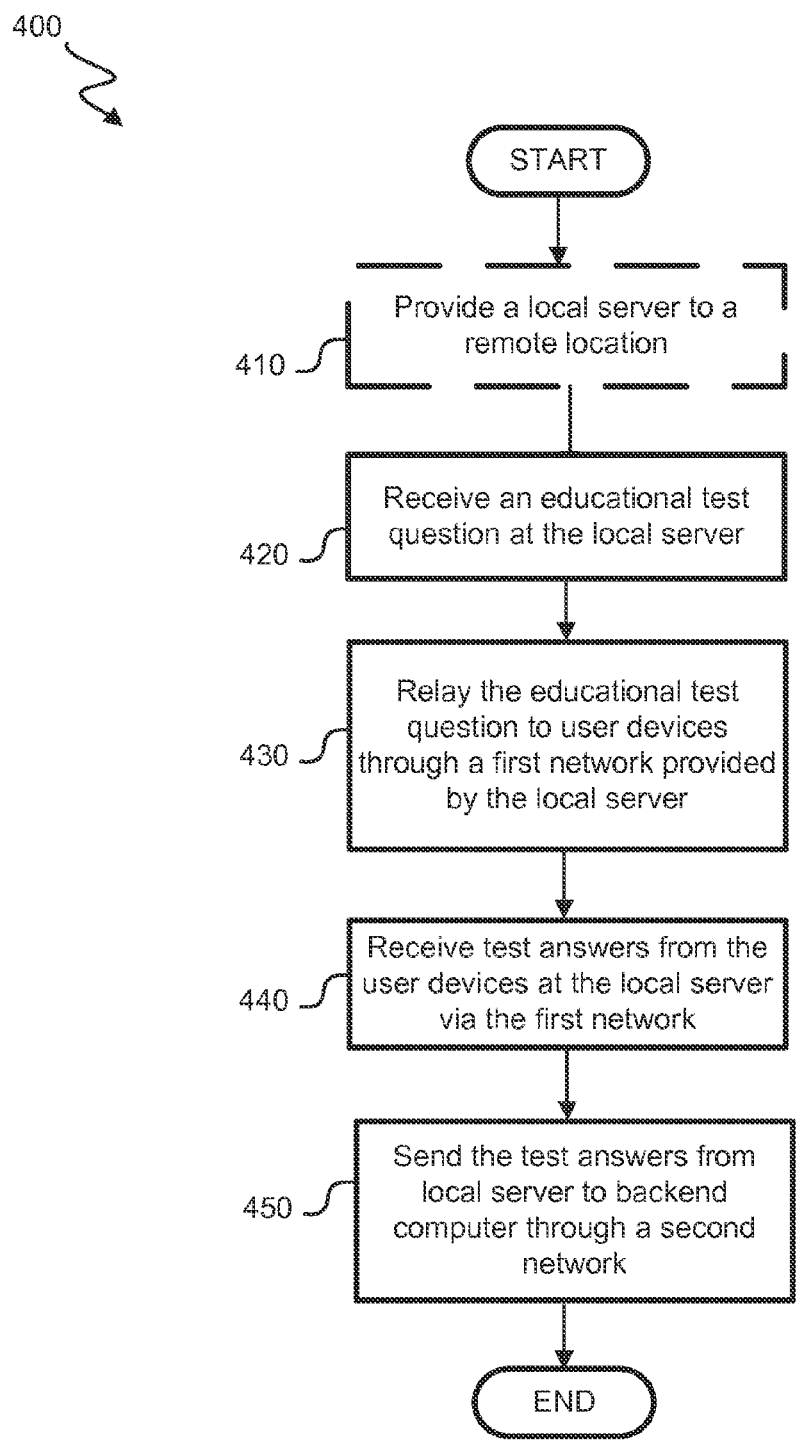
FIG. 4 illustrates an illustrative flow for distributing an educational test question and receiving test answers described herein, according to at least one example.

With reference now to FIG. 4, a flowchart illustrating one embodiment of distributing an educational test question and receiving test answers is shown. The process 400 is performed by one or several of the components of the system 100. The process 400 optionally begins at block 410 when a local server is provided to a remote location. For example, the local server can be shipped to a remote location through a transportation network. In another example, the local server may not be provided to a remote location (e.g., provided to a classroom with electricity).

At block 420, an educational test question is received at the local server. For example, the educational test question is provided on a storage medium to the local server. The local server can identify the educational test question. In some examples, a storage medium is interruptably coupled with the local server, and when the storage medium is coupled with the local server, the educational test question is copied to the local memory and/or stored in a data store (e.g., the test question/answer data store 280).

At block 430, the educational test question is relayed to user devices through a first network provided by the local server. For example, the local server provides the first network to the user devices and a network adapter associated with the local server relays the educational test question from the local memory to the first user device and the second user device. The user devices can receive the educational test question and display the educational test question for a user that operates the user device.

In some embodiments, the local server provides the educational test question through a network page. The network page can be SSL-encrypted. The user devices can access the network page and the educational test question is securely transmitted (e.g., thwarting a man-in-the-middle attack or fraudsters from accessing the educational test question).

At block 440, test answers are received from the user devices at the local server via the first network. For example, the user provides the test answer in response to receiving the educational test question. One or more users can provide individual test answers to the test question. The test answers can be combined by user or user device at the local server and/or backed up to the local memory. In some examples, the user devices store the test answers locally when the local server is inaccessible (e.g., unplugged, turned off, not providing/transmitting a WiFi signal for the user devices, etc.). Test answers may be provided to the local server at a later time (e.g., when the local server is accessible).

At block 450, the test answers are sent from the local server to the backend computer through the second network. For example, the local server can access a second network through a network adapter (e.g., a cellular adapter, a WiFi adapter, etc.) and transmit the test answers to the backend computer 110. Test answers may also be transmitted through a transportation network 160 using a storage medium (e.g., the storage medium contains encrypted educational test questions and is shipped through the transportation network).

Figure 5:
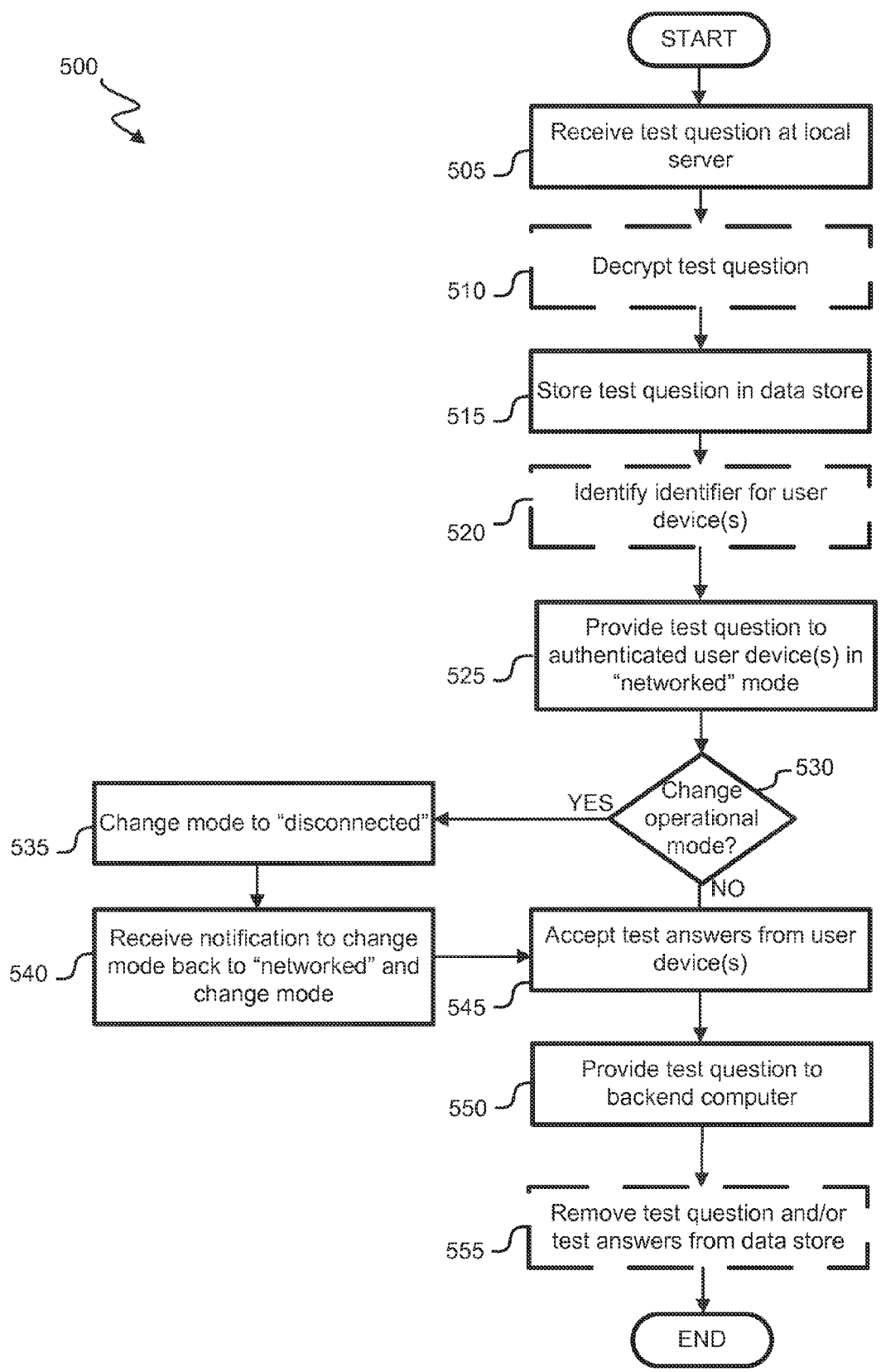
FIG. 5 illustrates an illustrative flow for distributing an educational test question and receiving test answers described herein, according to at least one example.

With reference now to FIG. 5, a flowchart illustrating one embodiment of distributing an educational test question and receiving test answers is shown. The process 500 is performed by one or several of the components of the system 100. The process 500 begins at block 505 when a test question is received at a local server. The process for receiving an educational test question can be similar to the process discussed with FIG. 4.

In some examples, the backend computer, test administrator, or other entity can encrypt the test question and/or storage medium to help protect fraudsters from reading the data stored on the storage medium. Users of the storage medium can view the educational test question with the proper credentials or decryption key.

At block 510, the test question is optionally decrypted. For example, the local server uses a decryption key to decrypt the test question and/or other data on the storage medium. The decryption method may be any recognizable encryption/decryption method known in the art, including pretty good privacy (PGP) encryption, one-time pad encryption, advanced encryption standard (AES), etc.

At block 515, the test question is stored in a data store. For example, the test question may be automatically copied from a storage medium to the data store and/or local memory. The educational test question can be automatically copied to the local memory without instruction from a user. In some instances, the stored version of the educational test question is accessed in case the storage medium is removed or interrupted.

At block 520, the identifier is identified for user device(s). For example, the local server and/or backend computer identifies the user identifier for the user and/or user device (e.g., device identifier, user name, student identifier, etc.). In another example, a session identifier is established. The user device may accept the session identifier (e.g., storing a cookie at the user device, allowing the local server to identify a media access control (MAC) address as a unique identification of the user device accessing the educational test question, etc.).

At block 525, the test question is provided to authenticated user device(s) in a "networked" mode. For example, the educational test question is provided to the user devices while the local server is in a networked mode by transmitting the educational test question to each identified user device or by hosting a shared network page that provides the test question at one location for the user devices to access.

At block 530, determine whether to change the operational mode. If yes, proceed to block 535 otherwise proceed to block 545. For example, the local server may determine whether to change the operational mode from a networked mode to a disconnected mode. The disconnected mode can help stop access to a network that was provided by the local server. In some embodiments, the local server may determine to change to a disconnected mode when a test is in progress to block access to the second network.

At block 535, the mode is changed to disconnected. For example, the local server identifies that a test has started (e.g., at a start time) and has not ended (e.g., before an end time). The disconnected mode may implement a variety of methods for entering a disconnected mode, including using a firewall and/or restrictive subnet masks, unplugging wires, deactivating adapters, deactivating settings, activating a web monitoring program to block groups of network pages (e.g., all network pages), limiting IP settings (e.g., similar to a router), adjusting native routing capabilities of the operating system on the local server, etc.

At block 540, a notification is received to change the mode back to networked mode. For example, the test may end or a proctor/user can notify the local server to change the mode to networked mode (e.g., through a display 340, using the sensor 350 to select the mode, etc.). The network mode is changed to networked mode.

At block 545, the test answers are accepted from the user devices. For example, the local server can receive information indicative of the test answers from the user devices via the first network. For example, the information includes the test answers (e.g., "my essay includes . . . " or "A, B, A, D") and/or a file that contains the test answers (e.g., answers.txt). The test answer can be transmitted from the user device via the first network to the local server. In some examples, the test answers are entered on a network page and transmitted via the first network as the user provides each answer to the user device, resulting in a plurality of transmissions of test answers. The test answers from each device may be different from each other, even though the test questions are the same. In some examples, the test questions are different for one or more of the user devices (e.g., test question A to user device 1, test question B to user device 2, test question 1 to user device 3, etc.).

At block 550, the test answers are provided to the backend computer. For example, the test answers are stored on a storage medium and provided to the backend computer via a transportation network 160. In another example, the test answers are transmitted wirelessly to the backend computer via the second network 150. The test answers may correspond with the educational test questions and/or answer key managed by the backend computer.

At block 555, the test questions and/or test answers are optionally removed from the data store. In some embodiments, the data may be stored on a storage medium that is interruptably coupled to the local server, and then decoupled from the local server to preserve the data (e.g., unplugged, removed, turned off, etc.). The storage medium may be inaccessible on the second network 150 and/or encrypted before the data is accessible via the second network 150. After the end time of the test, the data stored in the test question/answer data store 280 and/or the identifier data store 290 (e.g., local memory) can be deleted. The data may be deleted before the local server is connected with the second network 150.

Figure 6:
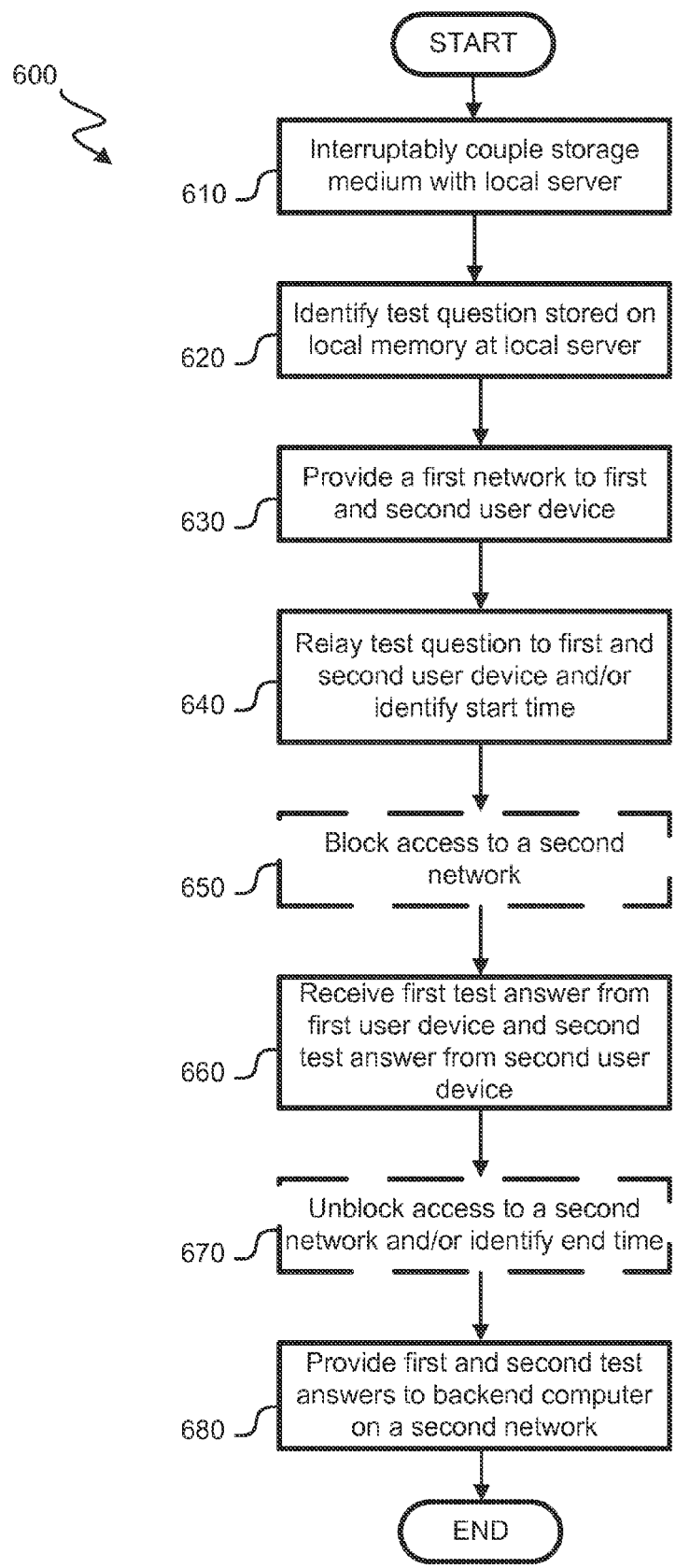
FIG. 6 illustrates an illustrative flow for distributing an educational test question and receiving test answers described herein, according to at least one example.

With reference now to FIG. 6, a flowchart illustrating one embodiment of distributing an educational test question and receiving test answers is shown. The process 600 is performed by one or several of the components of the system 100. The process 600 begins at block 610 when a storage medium is interruptably coupled with the local server. For example, the storage medium may be plugged into an I/O port provided by the local server for a temporary amount of time and unplugged, removed, turned off, etc. from the port at a later time. In some examples, when the storage medium is coupled with the local server, the educational test question is copied to the local memory and/or stored in a data store.

At block 620, the test questions are identified on the local memory at the local server. For example, the educational test question is provided on a storage medium to the local server. The local server can identify the educational test question (e.g., identify the storage location in the data store, identify the file location, etc.).

At block 630, the first network is provided to the first and second user devices. For example, the local server may transmit a network signal through a network adapter in order to provide the first network to the user devices. In another example, the local server can provide wired connection ports so that the user devices can access the first network through one or more wired connections.

At block 640, the test questions are relayed to the first and second user device and/or a start time is identified. For example the educational test question is relayed to the user devices at the start time of the test. In another example, the educational test question is provided to the user devices while the local server is in a networked mode by transmitting the educational test question to each identified user device or by hosting a shared network page that provides the test question at one location for the user devices to access. The local server can provide the educational test question for a particular time (e.g., after a start time of a test and until an end time of the test) or for an undetermined amount of time (e.g., until the local server is unplugged, loses power, or turned off).

At block 650, the access to a second network is optionally blocked. The process for blocking the second network can be similar to the process discussed with FIG. 5 (e.g., using a firewall, restrictive subnet mask, etc.).

At block 660, the first test answer is received from the first user device and the second test answer is received from the second user device. The test answers can be transmitted from the user device via the first network to the local server. In some examples, the test answers are entered on a network page and transmitted via the first network as the user provides each answer to the user device, resulting in a plurality of transmissions of test answers.

At block 670, the access to the second network is optionally unblocked. For example, the local server may enter a networked mode and help deliver educational and networked content to the user devices. The networked mode can implement a less restrictive firewall (or deactivate/turn off the firewall), implement less restrictive subnet masks, connect wires or other physical connections, turn on the local server, enable connections, etc. When unblocked, the test answers can be transmitted wirelessly to the backend computer via the second network 150 or transmitted via a transportation network 160 using a storage medium. The test answers may correspond with the educational test questions and/or answer key managed by the backend computer.

In some examples, an end time is also identified. The end time may correspond with the end of a test and the user devices can provide the test answers at the end of the test. After the end time of the test, the data stored in the local memory can be deleted and/or backed up to a substantially secure location.

At block 680, first and second test answers are provided to a backend computer on a second network 150. Test answers may also be transmitted through a transportation network 160 using a storage medium (e.g., the storage medium contains encrypted educational test questions and is shipped through the transportation network).

Figure 7:
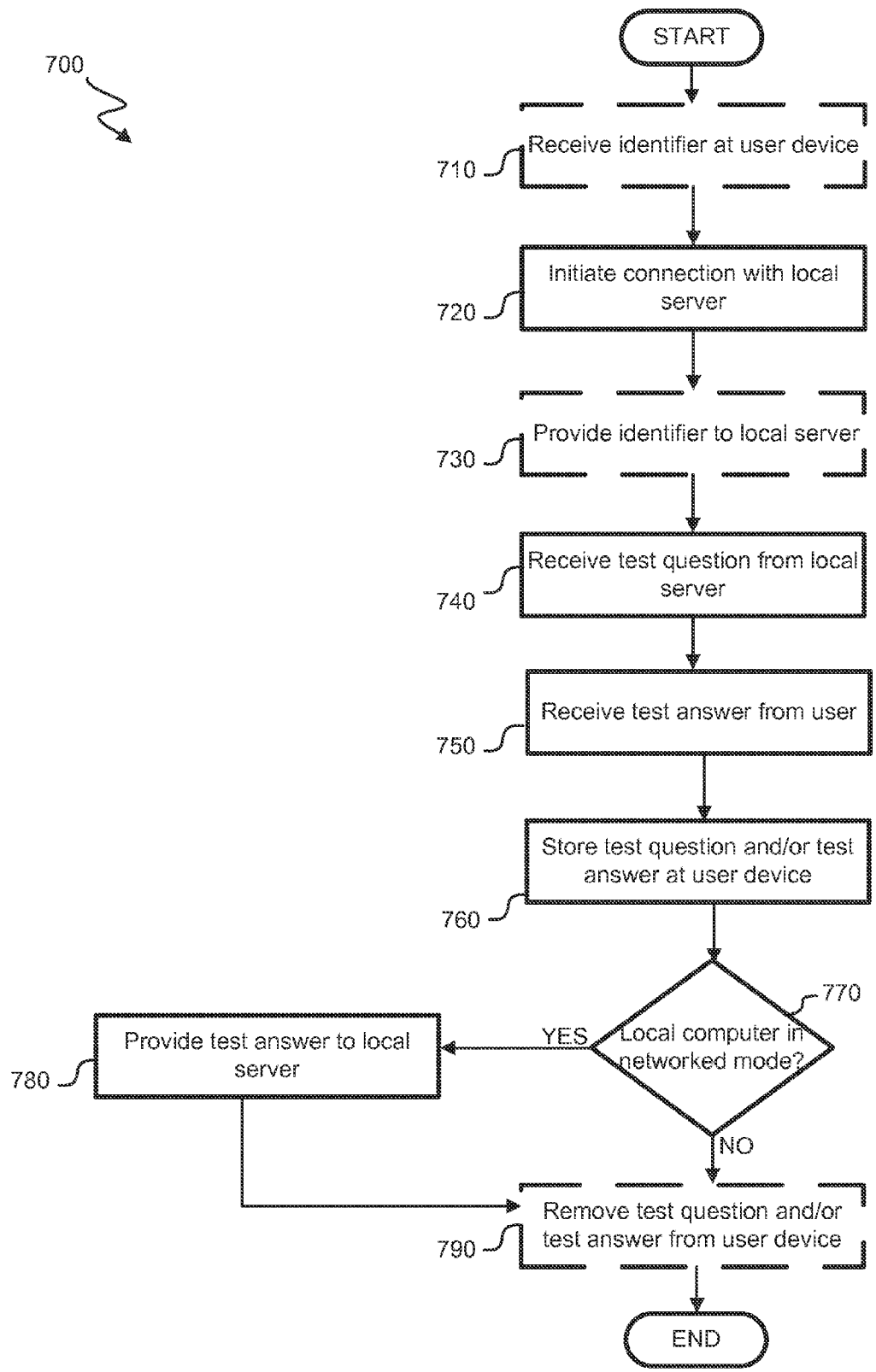
FIG. 7 illustrates an illustrative flow for distributing an educational test question and receiving test answers described herein, according to at least one example.

With reference now to FIG. 7, a flowchart illustrating one embodiment of distributing an educational test question and receiving test answers is shown. The process 700 is performed by one or several of the components of the system 100. The process 700 begins at block 710 when an identifier is optionally received at a user device. For example, the identifier can include a user identifier, user device identifier, session identifier, etc.

At block 720, a connection is initiated with a local server. For example, the local server will transmit a network signal. The user device can identify a transmitted signal from the local server using a network adapter/network antenna configuration and establish a connection through the transmitted signal.

At block 730, the identifier is optionally provided to a local server. For example, in a stateless protocol, a session identifier can be transmitted between the local server and user device to identify the location of the user (e.g., that the user has accessed the test question). In another example, the identifier may correspond with a user device identifier after the user provides login credentials to the local server to authenticate the user and access protected content.

At block 740, the test question is received from a local server. For example, the educational test question is received through a first network from the local server (e.g., wired, wirelessly, etc.). The user device can provide the educational test question to a user (e.g., by displaying the question on a screen associated with the user devices 130, by audibly providing the question through speakers on the user devices 130, etc.).

At block 750, the test answer is received from a user. For example, after the user device provides the educational test question to the user (e.g., displayed, audibly provided, etc.), the user provides a test answer that corresponds with the educational test question back to the user device. The test answer can be typed, spoken, or otherwise identified by the user device to be accepted by the user device.

At block 760, the test question and/or test answer is stored at a user device. The test answer can be stored in any suitable storage medium or local storage (e.g., RAM, ROM, flash memory, USB, removable storage and/or non-removable storage, disk drives and their associated computer-readable media, data structures, program modules, SRAM, DRAM, etc.).

At block 770, determine whether the local server is in networked mode. If yes, proceed to block 780 otherwise proceed to block 790. For example, the user device may ping the local server to determine if a connection with the local server is possible. When the test question is provided through a networked page and the network page is inaccessible, the user device may infer that the local server is not in networked mode, and vice versa.

At block 780, the test answer is provided to a local server. For example, the test answer may be transmitted to the local server. The local server can accept the test answer and store the test answer in local memory or a storage medium. The test answer may alternatively be transmitted directly to the local server without storing the test answer on the user device. For example, the user may provide the test answer directly to the local server.

At block 790, the test question and/or test answer is removed from a user device. For example, after the end time of the test, the data stored in local memory at the user device can be deleted. The data may be deleted once the user device transmits the test answer to the local server and/or before the local server is connected with the second network. In some examples, the local server may delete/remove the educational test question and/or test answer from the local memory of the user device to ensure the information is deleted.

Figure 8:
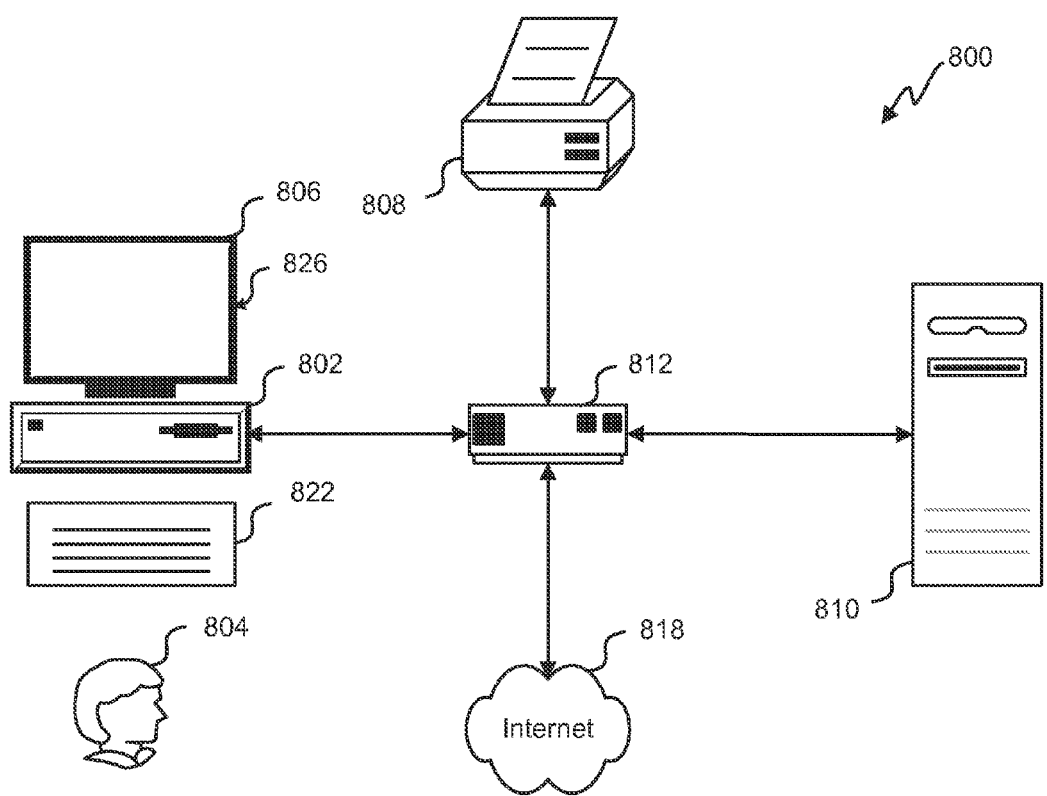
FIG. 8 illustrates an example environment for distributing an educational test question and receiving test answers described herein, according to at least one example.

With reference now to FIG. 8, an exemplary environment with which embodiments may be implemented is shown with a computer system 800 that can be used by a user 804 as all or a component of the system 100. The computer system 800 can include a computer 802, keyboard 822, a network router 812, a printer 808, and a monitor 806. The monitor 806, processor 802 and keyboard 822 are part of a computer system 826, which can be a laptop computer, desktop computer, handheld computer, mainframe computer, etc. The monitor 806 can be a CRT, flat screen, etc.

A user 804 can input commands into the computer 802 using various input devices, such as a mouse, keyboard 822, track ball, touch screen, etc. If the computer system 800 comprises a mainframe, a designer 804 can access the computer 802 using, for example, a terminal or terminal interface. Additionally, the computer system 826 may be connected to a printer 808 and a server 810 using a network router 812, which may connect to the Internet 818 or a WAN.

The server 810 may, for example, be used to store additional software programs and data. In one embodiment, software implementing the systems and methods described herein can be stored on a storage medium in the server 810. Thus, the software can be run from the storage medium in the server 810. In another embodiment, software implementing the systems and methods described herein can be stored on a storage medium in the computer 802. Thus, the software can be run from the storage medium in the computer system 826. Therefore, in this embodiment, the software can be used whether or not computer 802 is connected to network router 812. Printer 808 may be connected directly to computer 802, in which case, the computer system 826 can print whether or not it is connected to network router 812.

With reference to FIG. 9, an embodiment of a special-purpose computer system 904 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 626, it is transformed into the special-purpose computer system 904.

Special-purpose computer system 904 comprises a computer 902, a monitor 906 coupled to computer 902, one or more additional user output devices 930 (optional) coupled to computer 902, one or more user input devices 940 (e.g., keyboard, mouse, track ball, touch screen) coupled to computer 902, an optional communications interface 950 coupled to computer 902, a computer-program product 905 stored in a tangible computer-readable memory in computer 902. Computer-program product 905 directs system 904 to perform the above-described methods. Computer 902 may include one or more processors 960 that communicate with a number of peripheral devices via a bus subsystem 990. These peripheral devices may include user output device(s) 930, user input device(s) 940, communications interface 950, and a storage subsystem, such as random access memory (RAM) 970 and non-volatile storage drive 980 (e.g., disk drive, optical drive, solid state drive), which are forms of tangible computer-readable memory.

Computer-program product 905 may be stored in non-volatile storage drive 980 or another computer-readable medium accessible to computer 902 and loaded into memory 970. Each processor 960 may comprise a microprocessor, such as a microprocessor from Intel® or Advanced Micro Devices, Inc.®, or the like. To support computer-program product 905, the computer 902 runs an operating system that handles the communications of product 905 with the above-noted components, as well as the communications between the above-noted components in support of the computer-program product 905. Exemplary operating systems include Windows® or the like from Microsoft® Corporation, Solaris® from Oracle®, LINUX, UNIX, and the like.

User input devices 940 include all possible types of devices and mechanisms to input information to computer system 902. These may include a keyboard, a keypad, a mouse, a scanner, a digital drawing pad, a touch screen incorporated into the display, audio input devices such as voice recognition systems, microphones, and other types of input devices. In various embodiments, user input devices 940 are typically embodied as a computer mouse, a trackball, a track pad, a joystick, wireless remote, a drawing tablet, a voice command system. User input devices 940 typically allow a user to select objects, icons, text and the like that appear on the monitor 906 via a command such as a click of a button or the like. User output devices 930 include all possible types of devices and mechanisms to output information from computer 902. These may include a display (e.g., monitor 906), printers, non-visual displays such as audio output devices, etc.

Communications interface 950 provides an interface to other communication networks 995 and devices and may serve as an interface to receive data from and transmit data to other systems, WANs and/or the Internet. Embodiments of communications interface 950 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 950 may be coupled to a computer network, to a FireWire® bus, or the like. In other embodiments, communications interface 950 may be physically integrated on the motherboard of computer 902, and/or may be a software program, or the like.

RAM 970 and non-volatile storage drive 980 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 970 and non-volatile storage drive 980 may be configured to store the basic programming and data constructs that provide the functionality of various embodiments of the present invention, as described above.

Software instruction sets that provide the functionality of the present invention may be stored in RAM 970 and non-volatile storage drive 980. These instruction sets or code may be executed by the processor(s) 960. RAM 970 and non-volatile storage drive 980 may also provide a repository to store data and data structures used in accordance with the present invention. RAM 970 and non-volatile storage drive 980 may include a number of memories including a main random access memory (RAM) to store of instructions and data during program execution and a read-only memory (ROM) in which fixed instructions are stored. RAM 970 and non-volatile storage drive 980 may include a file storage subsystem providing persistent (non-volatile) storage of program and/or data files. RAM 970 and non-volatile storage drive 980 may also include removable storage systems, such as removable flash memory.

Bus subsystem 990 provides a mechanism to allow the various components and subsystems of computer 902 communicate with each other as intended. Although bus subsystem 990 is shown schematically as a single bus, alternative embodiments of the bus subsystem may utilize multiple busses or communication paths within the computer 902.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A local server for providing a distribution of an educational test question between a backend computer and a plurality of user devices comprising:
 a processor;
 a local memory coupled with the processor;
 a storage medium, wherein:
  the storage medium contains the educational test question,
  the educational test question is stored on the storage medium by the backend computer,
  the storage medium is interruptably coupled with the local server, and
  when the storage medium is coupled with the local server, the educational test question is copied to the local memory;
 a network adapter, wherein:
  the network adapter enables the local server to provide a network connection between a first network and the plurality of user devices, including enabling access to a first user that operates a first user device in the plurality of user devices and a second user that operates a second user device in the plurality of user devices,
  the first and second users engaged with the first network, and
  the network adapter relays the educational test question from the local memory to the first user device and the second user device;
 a network antenna that interacts with the network adapter, wherein:
  the network antenna is used to transmit the educational test question to the first user device and the second user device from the local memory via the first network, in response to receiving the educational test question at the first user device and the second user device, the network antenna receives information indicative of a first test answer from the first user device via the first network and a second test answer from the second user device via the first network, and the network antenna provides the first test answer and second test answer to the backend computer on a second network;

the local server is configured to determine when a test is in progress to block access to the second network by temporarily disabling the network adapter when the test starts and enabling the network adapter when the test ends, wherein when the local server is connected to the first network, the local server is not connected to the second network, and the local server further comprising:

a reset/reboot switch, wherein the reset/reboot switch is configured to reboot an operating system on the local server without turning the local server on or off; and a cellular adapter, wherein the cellular adapter is configured to connect the local server to the first network or the second network.

2. The local server for providing the distribution of the educational test question between the backend computer and the plurality of user devices of claim 1 wherein the educational test question is provided to the first user device and the second user device at a start time and the first test answer and second test answer are received at an end time.

3. The local server for providing the distribution of the educational test question between the backend computer and the plurality of user devices of claim 2 wherein the local server blocks access to the second network at the start time and unblocks access to the second network at the end time.

4. The local server for providing the distribution of the educational test question between the backend computer and the plurality of user devices of claim 1 wherein the educational test question is encrypted when the educational test question is stored with the storage medium and decrypted when the educational test question is stored with the local memory.

5. The local server for providing the distribution of the educational test question between the backend computer and the plurality of user devices of claim 4 wherein the decrypted educational test question is transmitted to the first user device and the second user device via the first network.

6. The local server for providing the distribution of the educational test question between the backend computer and the plurality of user devices of claim 1 wherein the educational test question is automatically copied to the local memory from the storage medium without instruction from a user.

7. The local server for providing the distribution of the educational test question between the backend computer and the plurality of user devices of claim 1 wherein the educational test question is the same for the first user device and the second user device, and wherein the first test answer from the first user device and the second test answer from the second user device are different from each other.

8. A system for providing a distribution of an educational test question between a backend computer and a plurality of user devices comprising:

the backend computer; and a local server, the local server comprising:
a processor;
a local memory coupled with the processor;
a storage medium, wherein:

the storage medium contains the educational test question, the educational test question is stored on the storage medium by the backend computer, the storage medium is interruptably coupled with the local server, and when the storage medium is coupled with the local server, the educational test question is copied to the local memory;

a network adapter, wherein:

the network adapter enables the local server to provide a network connection between a first network and the plurality of user devices, including enabling access to a first user that operates a first user device in the plurality of user devices and a second user that operates a second user device in the plurality of user devices, the first and second users engaged with the first network, and the network adapter relays the educational test question from the local memory to the first user device and the second user device;

a network antenna that interacts with the network adapter, wherein:

the network antenna is used to transmit the educational test question to the first user device and the second user device from the local memory via the first network, in response to receiving the educational test question at the first user device and the second user device, the network antenna receives information indicative of a first test answer from the first user device via the first network and a second test answer from the second user device via the first network, and the network antenna provides the first test answer and second test answer to the backend computer on a second network; and the local server is configured to determine when a test is in progress to block access to the second network by temporarily disabling the network adapter when the test starts and enabling the network adapter when the test ends, wherein when the local server is connected to the first network, the local server is not connected to the second network.

9. The system for providing the distribution of the educational test question between the backend computer and the plurality of user devices of claim 8 wherein the educational test question is provided to the first user device and the second user device at a start time and the first test answer and second test answer are received at an end time.

10. The system for providing the distribution of the educational test question between the backend computer and the plurality of user devices of claim 9 wherein the local server blocks access to the second network at the start time and unblocks access to the second network at the end time.

11. The system for providing the distribution of the educational test question between the backend computer and the plurality of user devices of claim 8 wherein the educational test question is encrypted when the educational test question is stored with the storage medium and decrypted when the educational test question is stored with the local memory.

12. A method for distributing an educational test question between a backend computer and a plurality of user devices comprising:

identifying a storage medium, wherein:

the storage medium contains the educational test question, the educational test question is stored on the storage medium by the backend computer, the storage medium is interruptably coupled with a local server, and when the storage medium is coupled with the local server, the educational test question is copied to a local memory;

identifying a network adapter, wherein:

the network adapter enables the local server to provide a network connection between a first network and the plurality of user devices, including enabling access to a first user that operates a first user device in the plurality of user devices and a second user that operates a second user device in the plurality of user devices, the first and second users engaged with the first network, and the network adapter relays the educational test question from the local memory to the first user device and the second user device;

identifying a network antenna that interacts with the network adapter, wherein:

the network antenna is used to transmit the educational test question to the first user device and the second user device from the local memory via the first network, in response to receiving the educational test question at the first user device and the second user device, the network antenna receives information indicative of a first test answer from the first user device via the first network and a second test answer from the second user device via the first network, and the network antenna provides the first test answer and second test answer to the backend computer on a second network; and determining, by the local server, when a test is in progress to block access to the second network by temporarily disabling the network adapter when the test starts and enabling the network adapter when the test ends, wherein when the local server is connected to the first network, the local server is not connected to the second network.

13. The method for distributing the educational test question between the backend computer and the plurality of user devices of claim 12 wherein the educational test question is provided to the first user device and the second user device at a start time and the first test answer and second test answer are received at an end time.

14. The method for distributing the educational test question between the backend computer and the plurality of user devices of claim 13 wherein the local server blocks access to the second network at the start time and unblocks access to the second network at the end time.

15. The method for distributing the educational test question between the backend computer and the plurality of user devices of claim 12 wherein the educational test question is encrypted when the educational test question is stored with the storage medium and decrypted when the educational test question is stored with the local memory.

16. The method for distributing the educational test question between the backend computer and the plurality of user devices of claim 15 wherein the decrypted educational test question is transmitted to the first user device and the second user device via the first network.

17. The method for distributing the educational test question between the backend computer and the plurality of user devices of claim 12 wherein the educational test question is automatically copied to the local memory from the storage medium without instruction from a user.

18. The method for distributing the educational test question between the backend computer and the plurality of user devices of claim 12 wherein the educational test question is the same for the first user device and the second user device, and wherein the first test answer from the first user device and the second test answer from the second user device are different from each other.

19. The local server for providing a distribution of the educational test question between a backend computer and a plurality of user devices of claim 1, further comprising:

a system on chip (SOC), wherein the system on chip (SOC) integrates one or more components of the local server into a single chip substrate.

20. The local server for providing a distribution of the educational test question between a backend computer and a plurality of user devices of claim 1, wherein access to the second network is further blocked by activating a firewall to block one or more internet protocol (IP) addresses associated with the first user device, the second user device, or the backend computer.

21. The local server for providing a distribution of the educational test question between a backend computer and a plurality of user devices of claim 1, wherein access to the second network is further blocked by providing an internet protocol (IP) address with a restrictive subnet mask through the cellular adapter for the first network and a different IP address with a restrictive subnet mask through the network adapter for the second network.

22. The local server for providing a distribution of the educational test question between a backend computer and a plurality of user devices of claim 1, further comprising:

a sensor that is configured to accept input for up, down, left, right, or enter commands.

23. The local server for providing a distribution of the educational test question between a backend computer and a plurality of user devices of claim 1, further comprising:

a solar adapter configured to convert light energy into DC current, wherein the DC current is used to charge a battery associated with the local server.

24. The local server for providing a distribution of the educational test question between a backend computer and a plurality of user devices of claim 1, further comprising:

a charging circuit configured to charge a battery associated with the local server, wherein the charging circuit accepts power, conditions the power, and charges the battery using the conditioned power.

* * * * *